(No Model.)
A. HEUSSER.
VEHICLE TIRE AND SETTER THEREFOR.
No. 331,704. Patented Dec. 1, 1885.
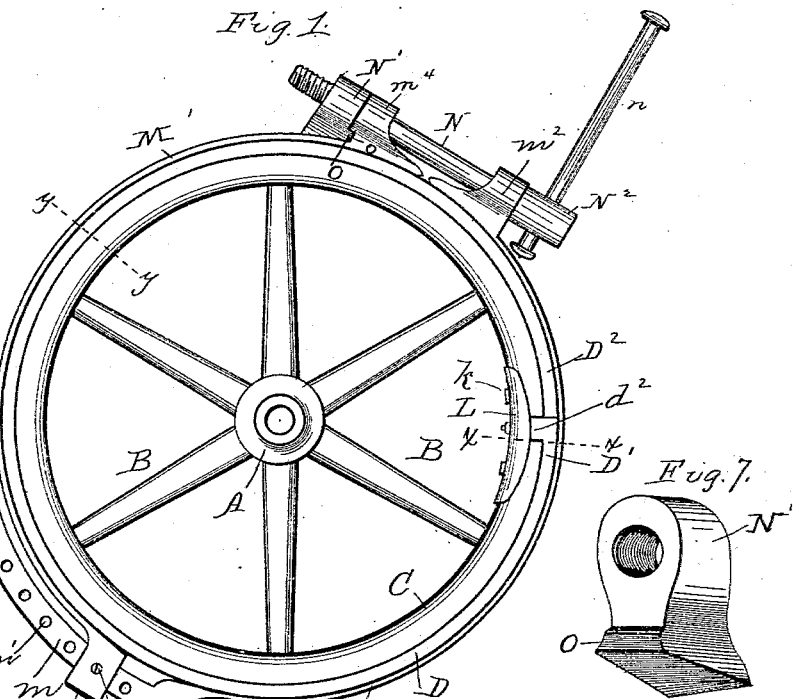
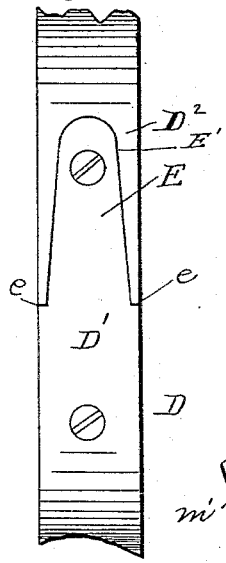
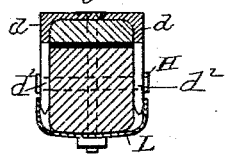
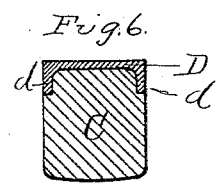
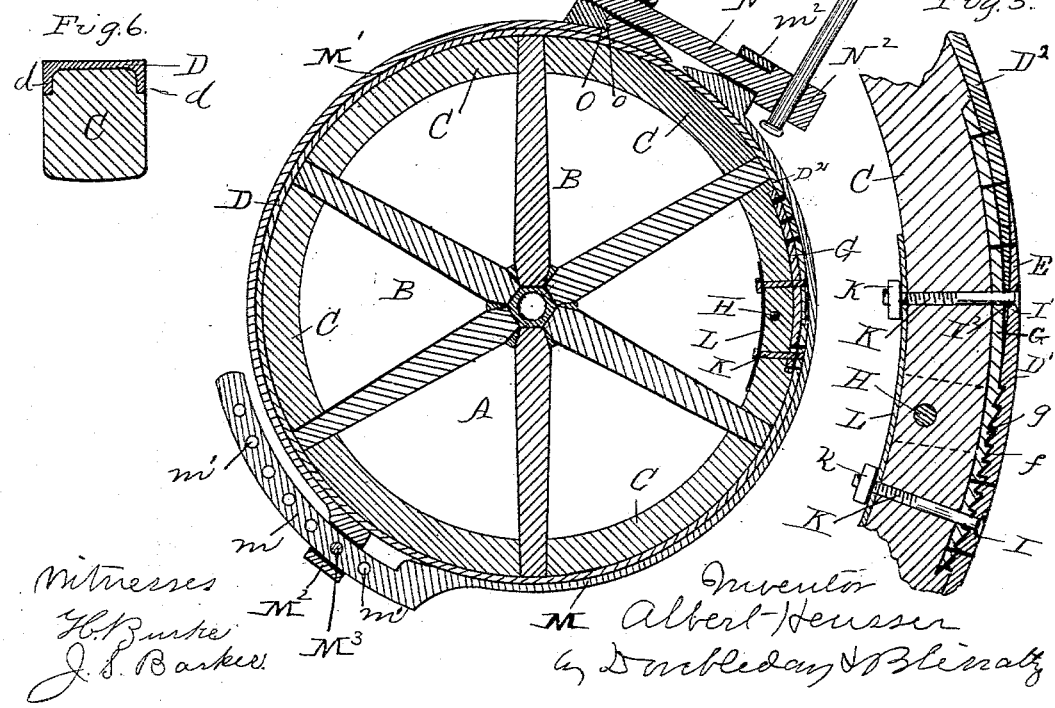
Witnesses
H. F. Burke
J. S. Barker
Inventor
Albert Heusser
by Doubleday & Blinot

UNITED STATES PATENT OFFICE.

ALBERT HEUSSER, OF TAYLOR, NEVADA, ASSIGNOR OF ONE-HALF TO ARTHUR J. UNDERHILL, OF SAME PLACE.

VEHICLE-TIRE AND SETTER THEREFOR.

SPECIFICATION forming part of Letters Patent No. 331,704, dated December 1, 1885.

Application filed June 6, 1885. Serial No. 167,870. (No model.)

*To all whom it may concern:*

Be it known that I, ALBERT HEUSSER, a citizen of the United States, residing at Taylor, in the county of White Pine and State of Nevada, have invented certain new and useful Improvements in Vehicle-Tires and Setters therefor, of which the following is a specification, reference being had therein to the accompanying drawings.

This invention relates to a device to take the place of the ordinary tires used on vehicle-wheels, the object being to provide a metal band which can be firmly held on the fellies, and which shall at the same time be readily removable, so that in case of necessity it can be shortened, the invention also including a simple mechanism by means of which the aforesaid device can be readily put in place on the wheel and fastened in position.

Figure 1 is a side or face view of a wheel and clamp or setter embodying my improvements. Fig. 2 is a central section transverse to the axle. Fig. 3 is a cross-section of the wheel-rim on the line $x\, x$, Fig. 1. Figs. 4, 5, 6, and 7 are details.

In the drawings, A represents the hub, and B B the spokes, of a wheel, which may be of any approved construction.

C C represent the sections of a felly, fastened to the outer ends of the spokes in any of the well-known ways. On the outside of the felly is the rim or tire D. It is recessed or grooved on the under side, the side walls or flanges being shown at $d\, d$. The ends are not welded together, but are provided with overlapping devices, whereby they may be securely joined. One end, D', has a tongue, E, there being rabbets at $e\, e$ by the sides of this tongue, and the other end has a recess, E', formed in its outer face, into which the tongue E is adapted to fit. On the under face of the end D' there are formed a series of teeth, $f$, and with these engage a corresponding series of teeth, $g$, formed on the spring-tongue G, fastened to the under side of the other end, D². It will be seen that when the ends D' and D² are forced together the teeth $f$ and $g$ will engage and hold said ends in whatever positions they have been forced to.

In order to secure the tire properly laterally on the felly, tongues $d^2\, d^2$ are formed thereon, which project inwardly, and are adapted to fit recesses formed in the sides of the felly. They are provided with corresponding apertures, and a pin or rivet, H, can be passed through them and the felly to bind them securely together.

At I an aperture is formed in the end D', and at I' I² an aperture is formed through the tongue E, and also through the plate G. Through these apertures bolts K can be passed, and then through bolt-holes formed at proper points in the felly. The nuts for securing the bolts in position are shown at $k\, k$, and a washer or wearing-plate, L, is interposed between this and the inner face of the felly.

In order to clamp a tire in place upon the wheel, I employ the improved device which I have shown in the drawings, and which consists, mainly, of two ring-segments, M M', they being so shaped as to approximate a circle, but at the same time so that the band which they form can be made longer or shorter, in order to permit the setter to be fitted to wheels of several sizes. The ring-segment M has at the end a perforated extension, $m$, provided with a series of bolt-apertures, $m'\, m'$, and provided at the other end with a perforated lug or abutment, $m^2$. The other segment, M', has a slotted or perforated lug, M², with a transverse bolt-aperture, in which is placed a bolt, M³. The parts $m$ and M² can be adjusted to and secured in different positions by means of the bolt M³ and the series of apertures $m'$. This segment M' also has a perforated lug or abutment, $m^4$, and by means of this and the other lug or abutment $m^2$ and a clamping-bolt, N, the two segments of the ring can be forcibly drawn together. The bolt N engages with a nut, N', which bears against the abutment $m^4$. The bolt N has a perforated head, N², through which passes an operating-rod, $n$, similar to that used in hand-vises. It will be seen that the setter is simple, and can be readily carried in an ordinary vehicle, so as to be at hand in case a tire must be reset or tightened.

Heretofore it has been necessary in case of the loss of a tire or other accident to carry the vehicle to a blacksmith or mechanic's shop for the purpose of repairing it; but with a clamp or setter of the character herein described, when combined with a tire or rim such as I have shown and described, the driver of the vehicle can himself repair the tire, at least sufficiently to enable him to reach a place where such repairing is generally done.

The manner of using the devices described will be readily understood. If a tire is lost, another is placed upon the wheel, the segments of the setter are placed upon the outside thereof, and the ends are rigidly forced together until they overlap sufficiently, whereupon the teeth $f$ and $g$ will engage. Then an aperture is formed in the felly for the pin or rivet H, and also apertures for the bolts K, and after said pin or rivets and bolts are fastened firmly in place the wheel is again ready for use.

If it is necessary to shorten a tire, it can be removed from the wheel and the end $D'$ or $D^2$ is shortened, (or both of them may be shortened,) and afterward the parts can be joined in the manner above described by means of the setter M M'.

The nut N' is formed separately from the setter, and therefore in case of wear or breakage it is not necessary to repair the whole setter or even one of the segments, inasmuch as the latter are entirely independent of both the bolt and the nut so far as construction is concerned. The nut has an offset, O, adapted to fit in a recess, $o$, in one of the ring-segments, and these parts are so constructed and related that the nut can be caused to revolve up to a certain point—that is to say, until some tension has begun to be exerted upon the tire—after which further tension is brought to bear by means of the bolt-handle above described. This construction and arrangement of nut enables me to save much time in getting the bolt through the nut, and at the same time, when the greatest tension is being exerted, the nut can be locked in position and prevented from being rotated while the bolt is being driven farther through it.

I am aware of the fact that use has been made heretofore of tire-tightening devices having a series of short bar-links pivotally connected together and forming a continuous series around the wheel, in combination with a lever for drawing the two ends of the series of links together, or a bolt and nut in place of the lever, and I do not claim such devices as my invention; but I believe myself to be the first to have devised a clamp or tightener of the character herein shown—that is to say, one having two sections entirely separable from each other at option, there being detachable connecting devices at each pair of adjacent ends.

What I claim is—

1. The combination, with the tire having the ends detachably connected together, of a setter having the ring-segments M M', one being formed with an extension provided with a series of perforations, to which the end of the other is adapted to be adjustably fastened, perforated lugs or abutments carried by said segments, and a bolt and nut adapted to force the said segments together, substantially as described.

2. A setter for tires having ring-segments separable from each other at two points, and which at one pair of adjacent ends are adjustable to different points, and at the other ends are provided with perforated lugs, and a bolt and nut separate from the segments, substantially as set forth.

3. A tire-setter having two ring-segments separable from each other at two points, a clamp for forcing and holding together one pair of ends of said segments, and a clamp for holding the other ends at different points relatively to each other after adjustment, substantially as set forth.

4. The combination, with a tire-setter having separable ends and abutments for the fastening devices on the said ends, of a bolt formed separately from the setter, and a nut, said nut and one of the aforesaid abutments having interlocking projections, whereby the nut can be prevented from rotating, substantially as set forth.

5. The combination, with the tire-setter having two sections, both ends of each of which sections are adapted, substantially as set forth, to be moved toward and from the corresponding ends of the opposite section, means, substantially as set forth, for fastening two of the adjacent ends of the sections at different positions, and means, substantially as set forth, situated diametrically opposite to the aforesaid fastening devices, for moving the other adjacent ends of the sections, substantially as described.

6. The combination, with the wheel, of the herein-described tire having separable ends, each provided with serrations or ribs adapted to interlock with those on the other, and the inward-projecting flanges $d$, adapted to lie by the sides of the felly, substantially as set forth.

7. The herein-described tire having separable ends, each end carrying a series of serrations or ribs, those carried by one end being adapted to interlock with the serrations or ribs carried by the other end, flanges $d$, adapted to bear against the sides of the felly, and inward-projecting lugs or plates $d^2$, provided with bolt-apertures, substantially as set forth.

8. The herein-described tire having the separable ends $D'$ $D^2$, the end $D^2$ being provided with a recess or slot and carrying ribs or serrations, and the end $D'$ having a tongue, E, adapted to fit into the said recess or slot, and carrying serrations or ribs adapted to engage with those aforesaid, both ends being provided with corresponding bolt-apertures, and the inward-projecting ears or plates $d^2$, substantially as and for the purposes set forth.

9. The herein-described tire having the separable ends $D'$ $D^2$, the end $D^2$ being provided with a recess or slot, and the end $D'$ with a tongue, E, fitting in said recess or slot and having serrations or ribs, and the serrated or ribbed metal strip G, secured to the end $D^2$, and adapted to engage with the aforesaid serrations or ribs, substantially as set forth.

In testimony whereof I affix my signature in presence of two witnesses.

ALBERT HEUSSER.

Witnesses:
WILLIAM C. BARRY,
LEWIS A. GIFFORD.